US010344658B2

(12) United States Patent
Minowa et al.

(10) Patent No.: US 10,344,658 B2
(45) Date of Patent: Jul. 9, 2019

(54) EXHAUST DEVICE

(71) Applicant: HONDA MOTOR CO., LTD., Tokyo (JP)

(72) Inventors: Toshiaki Minowa, Wako (JP); Naoki Ito, Wako (JP); Toshihide Uchida, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 224 days.

(21) Appl. No.: 15/615,275

(22) Filed: Jun. 6, 2017

(65) Prior Publication Data

US 2017/0356324 A1 Dec. 14, 2017

(30) Foreign Application Priority Data

Jun. 9, 2016 (JP) .................. 2016-115513

(51) Int. Cl.
F01N 13/08 (2010.01)
B60K 13/04 (2006.01)
F01N 13/00 (2010.01)

(52) U.S. Cl.
CPC .............. F01N 13/00 (2013.01); B60K 13/04 (2013.01); F01N 13/082 (2013.01); F01N 2590/11 (2013.01)

(58) Field of Classification Search
CPC ........ F01N 13/00; F01N 13/082; F01N 13/08; F01N 13/20; F01N 13/1811;

(Continued)

(56) References Cited

U.S. PATENT DOCUMENTS 2,902,102 A * 9/1959 Gorman ................. B60K 13/06
180/309
2,979,357 A * 4/1961 Leach ..................... B60R 19/48
180/89.2

(Continued)

FOREIGN PATENT DOCUMENTS

CN 102271989 A 12/2011
DE 19517462 A1 * 11/1995 ............. F01N 13/08

(Continued)

OTHER PUBLICATIONS

Chinese Office Action with English translation dated Apr. 18, 2019, 9 pages.

Primary Examiner — Edgardo San Martin
(74) Attorney, Agent, or Firm — Rankin, Hill & Clark LLP

(57) ABSTRACT

An object of the present invention is to provide an exhaust device capable of preventing a silencer from interfering with a component disposed in front of the silencer by allowing the silencer to slide down even when a load is input from a rear of the vehicle. A first tailpipe 34 is provided with an inclined bracket member 37. The inclined bracket member 37 has a sliding contact surface 37b inclined rearward and downward of a vehicle. A pressing portion 44 inclined rearward and downward of the vehicle is provided in an exhaust finisher bracket member 42 attached to an exhaust finisher 40. The pressing portion 44 contacts the sliding contact surface 37b when the exhaust finisher 40 is displaced forward of the vehicle. Then, the pressing portion 44 transmits the load so as to push down a silencer 32 via the sliding contact surface 37b.

8 Claims, 8 Drawing Sheets

(58) Field of Classification Search
CPC ............. F01N 13/1816; F01N 13/1838; F01N 13/185; B60K 13/00; B60K 13/04; B60K 13/06; B62D 25/20
See application file for complete search history.

(56) References Cited

U.S. PATENT DOCUMENTS

| | | | | |
|---|---|---|---|---|
| 2,992,035 | A * | 7/1961 | Tell | B60R 19/48 |
| | | | | 180/89.2 |
| 4,936,412 | A * | 6/1990 | Sala | B60K 13/04 |
| | | | | 181/252 |
| 7,032,702 | B2 * | 4/2006 | Rinklin | B60K 13/04 |
| | | | | 180/309 |
| 7,874,150 | B2 * | 1/2011 | Stadler | F01N 13/14 |
| | | | | 180/309 |
| 9,440,530 | B2 * | 9/2016 | Yoshida | B60K 13/04 |
| 10,072,555 | B2 * | 9/2018 | Kiryu | B60K 13/04 |
| 2011/0272202 | A1 | 11/2011 | Kawashiri et al. | |
| 2018/0149071 | A1 * | 5/2018 | Mueller | F01N 13/1811 |

FOREIGN PATENT DOCUMENTS

| | | | | |
|---|---|---|---|---|
| JP | 2006-151146 | A | | 6/2006 |
| JP | 2012241543 | A | * | 12/2012 |
| JP | 2015-000615 | A | | 1/2015 |
| JP | 2017210121 | A | * | 11/2017 |

* cited by examiner

EXHAUST DEVICE

CROSS REFERENCE TO RELATED APPLICATIONS

This application claims the foreign priority benefit under Title 35, United States Code, § 119 (a)-(d) of Japanese Patent Application No. 2016-115513, filed on Jun. 9, 2016, the disclosure of which is herein incorporated by reference in its entirety.

TECHNICAL FIELD

The present invention relates to an exhaust device.

BACKGROUND ART

As a vehicle structure accommodating a conventional exhaust device, one provided with a tunnel portion is known (for example, see Patent Document 1). The tunnel portion is located substantially in a center portion in a vehicle width direction of a floor panel, and forms a recess opening downward in a vehicle front-rear direction. An exhaust pipe is accommodated in the recess of the tunnel portion in the vehicle front-rear direction. A silencer is connected to the exhaust pipe. A tailpipe is connected to the silencer, so that exhaust gas of an engine is guided in a vehicle rearward direction.

An electrical component such as a battery constituting a hybrid system is held on a lower surface of the floor panel at a side of the tunnel portion.

Further, another conventional exhaust device for a vehicle is configured such that when a load is input to the vehicle from the rear, the silencer is brought into interference with a bulging portion of a lower case accommodating the electrical component and is guided in a falling direction, so that the silencer does not interfere with the electrical component (for example, see Patent Document 2).

CITATION LIST

Patent Literature

[Patent Document 1]
Japanese Patent Application Publication No. 2006-151146
[Patent Document 2]
Japanese Patent Application Publication No. 2015-000615

SUMMARY OF INVENTION

Technical Problem

However, for example, a muffler finisher is further attached to the tailpipe of the silencer in the vehicle rearward direction in some cases. In such a case, the load from the rear is first input to the muffler finisher and then moves the silencer to a front of the vehicle. Therefore, when there is the electrical component in front of the silencer, the silencer interferes with the electrical component. An object of the present invention is to provide an exhaust device capable of preventing the silencer from interfering with a component disposed in front of the silencer by allowing the silencer to slide down even when the load is input from the rear of the vehicle.

Solution to Problem

The present invention is an exhaust device for a vehicle equipped with a silencer system for silencing an exhaust sound of an internal combustion engine, wherein the silencer system includes a silencer located at a rear portion of the vehicle, a first tailpipe connected to the silencer, a second tailpipe disposed adjacent to the first tailpipe, and an exhaust finisher provided on the second tailpipe, and wherein the exhaust finisher has an exhaust finisher bracket member for pushing down the first tailpipe when the exhaust finisher is displaced forward of the vehicle. In the exhaust device for the vehicle of the present invention configured as described above, when the exhaust finisher is displaced forward of the vehicle, it contacts the first tailpipe to push down the first tailpipe in a vehicle downward direction. Thus, the silencer slides down in the vehicle downward direction.

It is preferred that the exhaust finisher bracket member protrudes to the rear of the first tailpipe from a side surface of the exhaust finisher. According to the present invention, the exhaust finisher bracket member moves in a direction to contact the first tailpipe as the exhaust finisher is displaced forward of the vehicle. Therefore, the load applied from the rear of the vehicle is a force which reliably pushes down the silencer via the exhaust finisher bracket member and allows the silencer to slide down.

It is preferred that at least one of the exhaust finisher bracket member and the first tailpipe has an inclined surface inclined rearwardly and downwardly. According to the present invention, when the load from the rear of the vehicle is applied to the first tailpipe by the inclined surface, which is provided on the exhaust finisher bracket member or on the first tailpipe and is inclined rearwardly and downwardly, the first tailpipe is pushed down in the vehicle downward direction.

It is preferred that an inclined bracket member having an inclined surface inclined rearwardly and downwardly is provided on a rear surface side of the first tailpipe. According to the present invention, when the load from the rear of the vehicle is applied to the inclined bracket member, the inclined bracket member pushes down the first tailpipe in the vehicle downward direction.

It is preferred that the exhaust finisher is inserted with the second tailpipe, and has an escape portion which allows the second tailpipe to escape in a vehicle downward direction when the exhaust finisher is displaced forward of the vehicle. According to the present invention, when the exhaust finisher is displaced forward of the vehicle, the escape portion can allow the second tailpipe to escape in the vehicle downward direction.

It is preferred that the escape portion includes a fragile portion to be deformed by contact with the second tailpipe. According to the present invention, when the exhaust finisher is displaced forward of the vehicle, the fragile portion can allow the second tailpipe to escape in the vehicle downward direction while the fragile portion is deformed by contact with the second tailpipe.

Advantageous Effects of Invention

According to the present invention, it is possible to provide an exhaust device capable of preventing the silencer from interfering with the component disposed in front of the silencer by allowing the silencer to slide down even when the load is input from the rear of the vehicle.

DESCRIPTION OF EMBODIMENTS

Hereinafter, an embodiment of the present invention will be described with reference to the drawings.

[Schematic Configuration of Exhaust Device]

Figure 1:
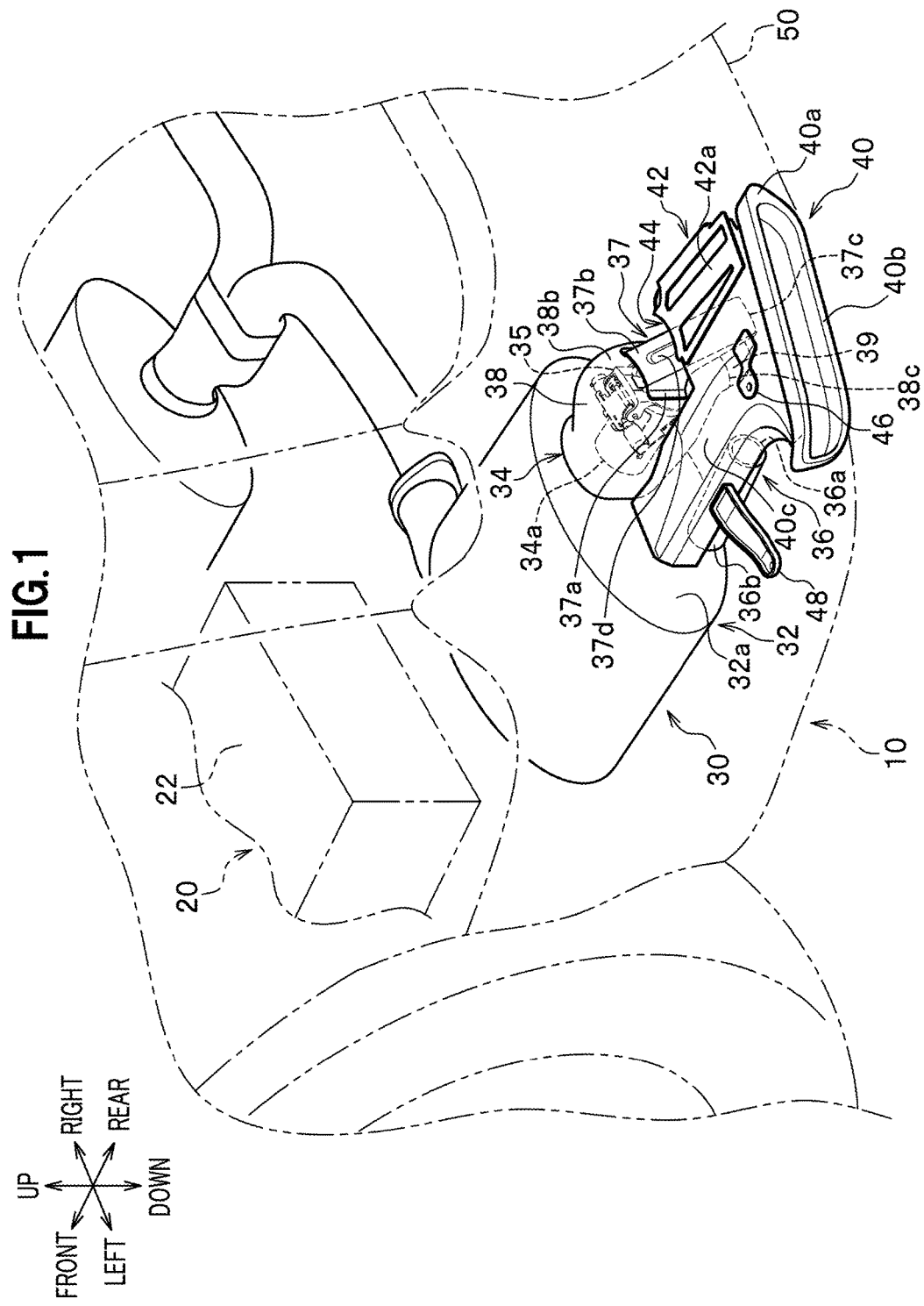
FIG. 1 is a perspective view of an exhaust device according to an embodiment of the present invention, illustrating an outline of a rear portion of a vehicle viewed from a rear left side of the vehicle.

FIG. 1 is a perspective view showing an outline of a rear portion of a hybrid vehicle 10 equipped with an exhaust device according to the present embodiment. The hybrid vehicle 10 includes a hybrid system 20. The hybrid system 20 has a battery 22 as an electrical component. The hybrid system 20 includes a motor generator supplied with power from the battery 22 or the like, and an engine as an internal combustion engine (neither is shown). The hybrid vehicle 10 is configured to be able to travel by a driving force output from at least one of the motor generator and the engine.

The hybrid vehicle 10 includes a silencer system 30 for silencing an exhaust sound of the engine. The silencer system 30 has a silencer 32. The silencer 32 of this embodiment is disposed behind the battery 22. That is, the battery 22 is disposed at a predetermined interval in front of the silencer 32.

To the silencer 32 of this embodiment, a first tailpipe 34 and a second tailpipe 36 disposed adjacent to the first tailpipe 34 are connected so as to protrude rearward of the vehicle. Therefore, exhaust gas flowing into the silencer from the engine (not shown) passes through at least one of two routes of the first tailpipe 34 and the second tailpipe 36, and is discharged into the atmosphere. In the present embodiment, the silencer 32 has two tailpipes of the first tailpipe 34 and the second tailpipe 36, but it is not limited thereto as long as it has two or more tailpipes.

The tailpipe 34 has an opening and closing mechanism 35 attached to a rear end of a tubular first tailpipe body 34a, a substantially spherical valve cover member 38 fixed to a rear side surface 32a of the silencer 32 and covering the first tailpipe 34, and a muffler end member 39 provided at an outlet of the valve cover member 38.

Figure 2:
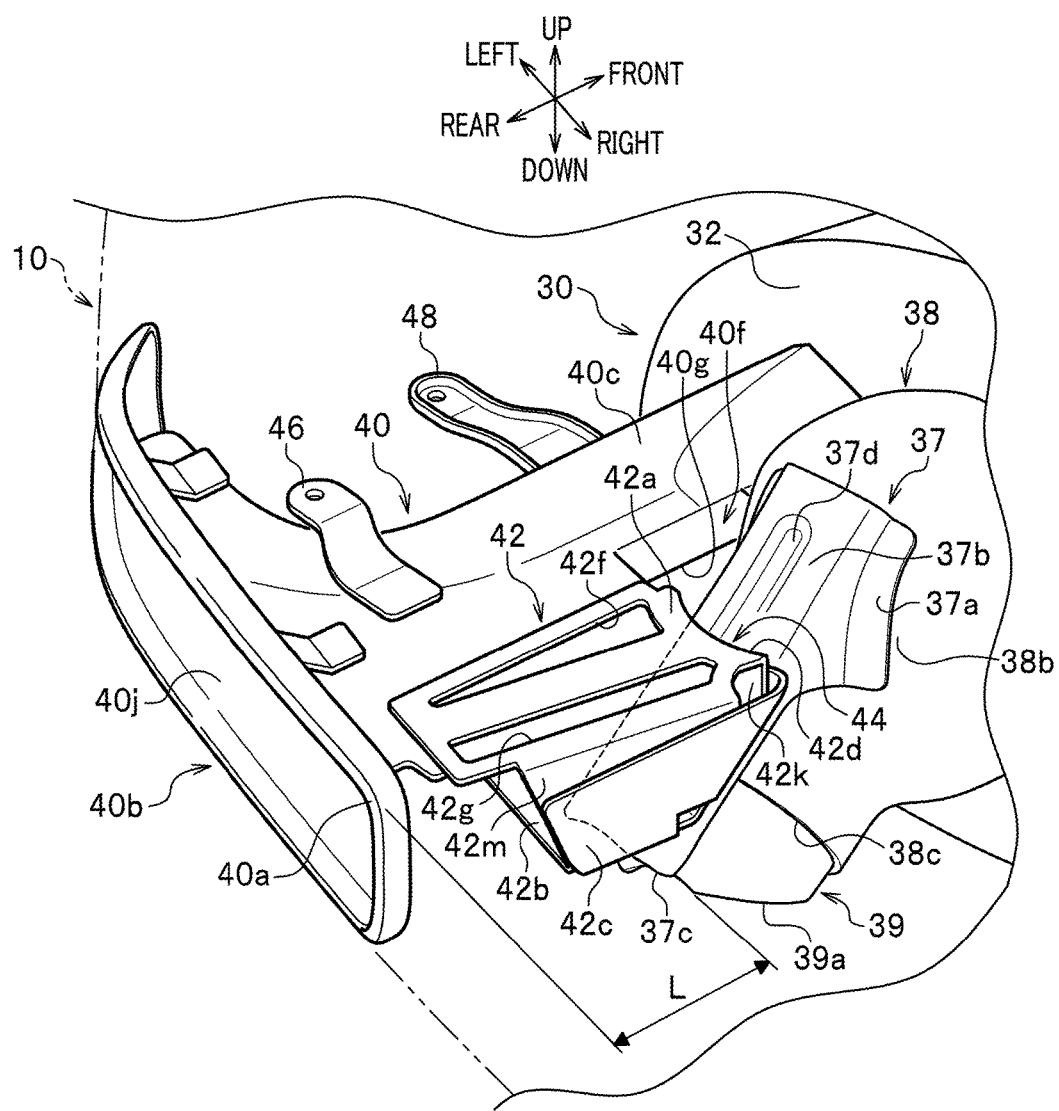
FIG. 2 is a perspective view of the exhaust device according to the embodiment of the present invention, illustrating an outline of a main portion viewed through a bumper from a rear right side of the vehicle.

The opening and closing mechanism 35 is accommodated inside the valve cover member 38. The opening and closing mechanism 35 of this embodiment is configured to be able to open and close an opening on an outlet side of the first tailpipe body 34a according to engine speed, engine displacement or throttle opening degree. As shown in FIG. 2, a downward exhaust port 38c is formed as an opening in a rear side surface 38b of the valve cover member 38. The substantially tubular muffler end member 39 is attached to the exhaust port 38c so as to extend obliquely downward in an axial direction of the exhaust port 38c.

The opening and closing mechanism 35 of this embodiment is closed in a low load operating state of the engine, and the exhaust gas flowing into the silencer 32 from the engine is discharged into the atmosphere through the second tailpipe 36. The opening and closing mechanism 35 is opened in a high load operating state of the engine, and the exhaust gas flowing into the silencer 32 from the engine is introduced into the valve cover member 38, too. The exhaust gas in the valve cover member 38 is discharged into the atmosphere through the muffler end member 39. In this manner, in the high load operating state, it is possible to discharge the exhaust gas simultaneously from both the second tailpipe 36 and the muffler end member 39 provided in the first tailpipe 34. Therefore, it is possible to control pressure of the silencer system 30 while reducing exhaust resistance in the high load operating state.

Further, as shown in FIG. 2, the valve cover member 38 of this embodiment is provided with an inclined bracket member 37. The inclined bracket member 37 has a mounting flange 37a fixed to the rear side surface 38b of the valve cover member 38, a sliding contact surface 37b having an inclined surface inclined rearward and downward of the vehicle at a predetermined angle α (see FIG. 7) and extending to a rear end edge 37c, and a bead portion 37d recessed in a longitudinal direction of the sliding contact surface 37b.

The second tailpipe 36 is provided with an exhaust finisher 40. The exhaust finisher 40 is mainly configured to include a tailpipe cover 40c for covering the second tailpipe 36 and an annular decorative portion 40b provided in a wide annular shape along a rear end outer peripheral edge of the tailpipe cover 40c. The annular decorative portion 40b is formed to be substantially flush with a bumper face 50 provided in a rear bumper of the hybrid vehicle 10 (see FIG. 1). A rear edge 40a of the annular decorative portion 40b has an upper side protruding rearward of the vehicle as compared with a lower side thereof.

An exhaust finisher bracket member 42 is attached to a right side surface 40f in a vehicle width direction of the exhaust finisher 40. The exhaust finisher bracket member 42 is provided with a pressing portion 44 at a position facing the first tailpipe 34. A structure of the pressing portion 44 will be described in detail below.

Figure 7:
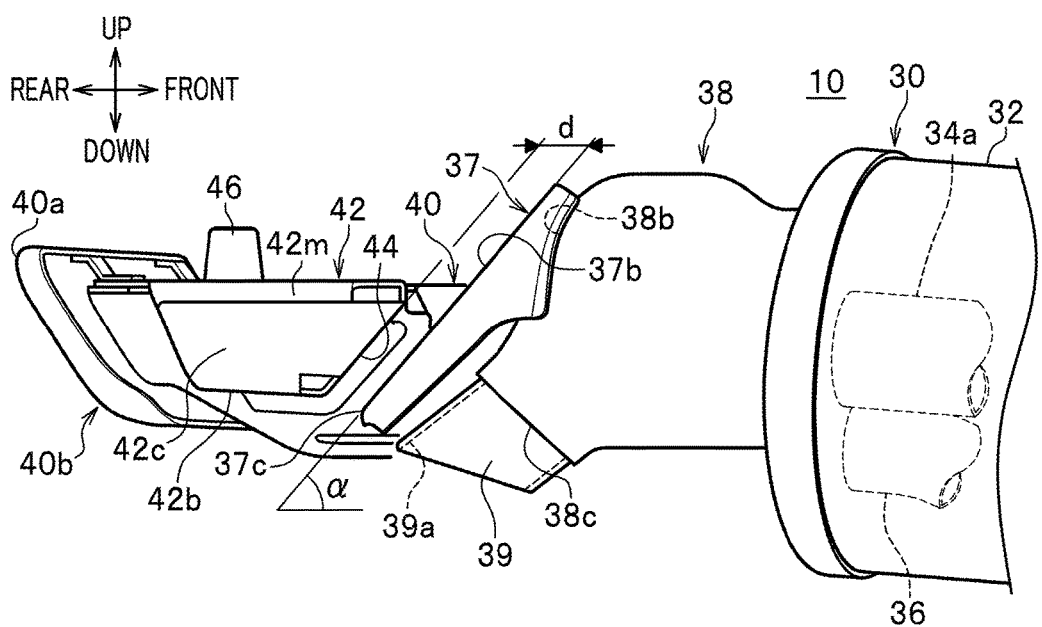
FIG. 7 is a side view of the exhaust device according to the embodiment of the present invention, illustrating a positional relationship between an inclined bracket member and the exhaust finisher bracket member.

As shown in FIG. 7, the pressing portion 44 of this embodiment is disposed so as to face the sliding contact surface 37b of the inclined bracket member 37 with a predetermined distance d therebetween in a vehicle front-rear direction. Thus, when the exhaust finisher 40 is displaced forward of the vehicle, the pressing portion 44 is brought into contact with the sliding contact surface 37b. The exhaust port 38c is formed as a downward opening in the rear side surface 38b of the valve cover member 38. The muffler end member 39 is attached downward to the exhaust port 38c. Thus, a space can be formed between the rear side surface 38b and the exhaust finisher bracket member 42. Therefore, the inclined bracket member 37 formed with the sliding contact surface 37b having the inclined surface can be disposed between the first tailpipe 34 and the exhaust finisher bracket member 42. Then, the pressing portion 44 is in sliding contact with the sliding contact surface 37b of the inclined bracket member 37. A load having been input in a vehicle forward direction becomes a component force directed in a vehicle downward direction by sliding contact of the pressing portion 44, so that the silencer 32 is pushed down.

FIG. 2 is a transparent perspective view of the exhaust device according to the embodiment of the present invention, showing peripheral members of two tailpipes viewed through a bumper from a rear right side of the vehicle. The exhaust finisher bracket member 42 mainly has an upper surface 42a, a lower surface 42b, and a side surface 42c having a substantially trapezoidal shape in a side view, and is formed to be substantially U-shaped in a cross-sectional view in the vehicle width direction. Among them, the upper surface 42a has a vertically elongated substantially trapezoidal shape in a plan view when the vehicle front-rear direction is defined as a height direction, and has two lightening openings 42f, 42g. Further, the lower surface 42b is formed with plural lightening openings 42h, 42i (see FIGS. 4, 6).

The exhaust finisher bracket member 42 of this embodiment further has a front surface 42d forming the pressing portion 44. The exhaust finisher bracket member 42 has a rectangular tubular shape with an axis in the vehicle front-rear direction. A front opening of the exhaust finisher bracket member 42 is formed to be closed by the front surface 42d.

The front surface 42d has an inclined surface inclined rearward and downward of the vehicle, and is inclined at the same angle as the predetermined angle α (see FIG. 7) of the sliding contact surface 37b of the inclined bracket member 37. The front surface 42d is formed larger than the sliding contact surface 37b in the vehicle width direction. Further, the front surface 42d is formed to be curved in a concave shape facing the sliding contact surface 37b of the inclined bracket member 37 (see FIG. 4). Thus, when the front surface 42d is brought into contact with the sliding contact surface 37b, the inclined bracket member 37 is unlikely to get out of the pressing portion 44 in the vehicle width direction.

Further, the front surface 42d has the front surface 42d as an outer surface material bent at a substantially right angle upward from a front edge of the lower surface 42b and an inner surface material 42k bent at a substantially right angle downward from a front edge of the upper surface 42a. The front surface 42d and the inner surface material 42k are configured to overlap each other.

The side surface 42c has an inner surface material 42m bent at a substantially right angle downward from a side edge of the upper surface 42a and the side surface 42c as an outer surface material bent at a substantially right angle rearward from a side edge of the front surface 42d. The inner surface material 42m and the side surface 42c are configured to overlap each other.

In the silencer system 30, a thickness direction dimension of a plate material of each side surface constituting the exhaust finisher bracket member 42 is larger than that of a plate material of each portion constituting the tailpipe cover 40c of the exhaust finisher 40. Therefore, the exhaust finisher bracket member 42 has higher rigidity than that of the tailpipe cover 40c.

In this embodiment, the exhaust finisher 40 is located in the most rear of the silence system 30 in the vehicle front-rear direction (see FIG. 2). That is, an inner end of the rear edge 40a in the annular decorative portion 40b of the exhaust finisher 40 is located behind the rear end edge 37c of the inclined bracket member 37 provided in the first tailpipe 34 by a predetermined dimension L in the vehicle front-rear direction.

Figure 3:
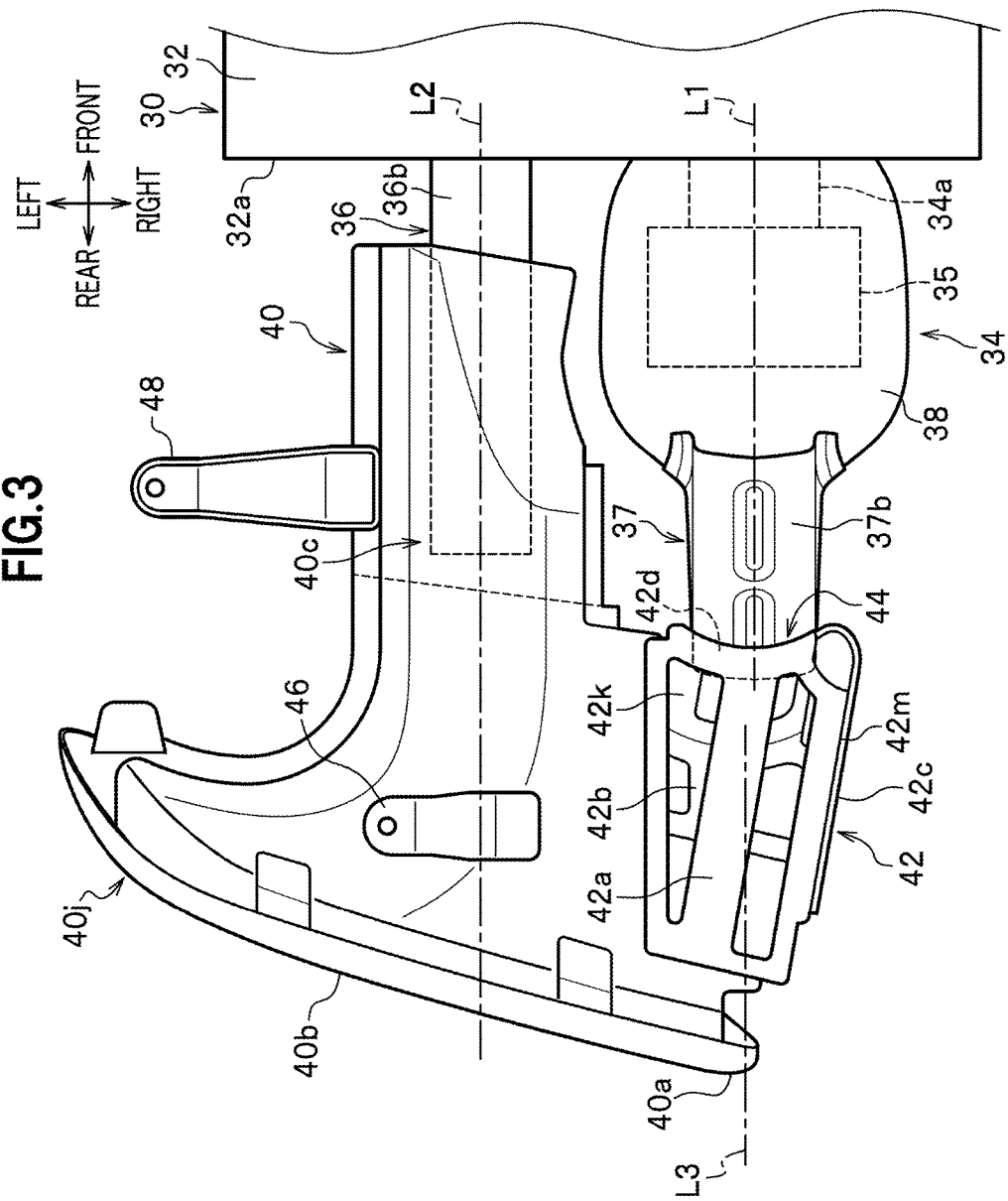
FIG. 3 is a top view of the exhaust device according to the embodiment of the present invention, illustrating a configuration of the main portion.

FIG. 3 is a top view of the exhaust device according to the embodiment of the present invention, illustrating a configuration of a main portion and showing a positional relationship among the valve cover member 38, the exhaust finisher 40, the exhaust finisher bracket member 42 and the inclined bracket member 37, which are located behind the silencer 32.

Figure 4:
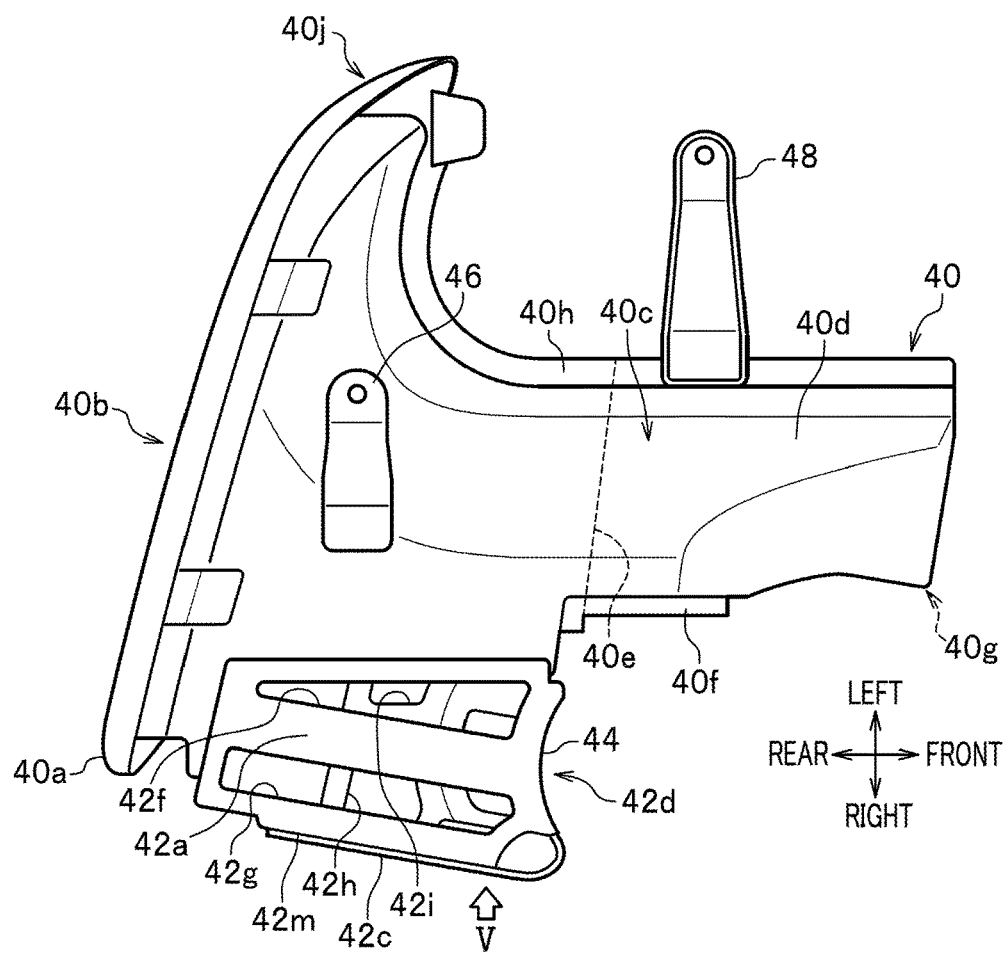
FIG. 4 is a top view of the exhaust device according to the embodiment of the present invention, illustrating the main portion showing an exhaust finisher and an exhaust finisher bracket member.

FIG. 4 is a top view of the main portion showing the exhaust finisher 40 and the exhaust finisher bracket member 42. In the exhaust device of this embodiment, the rectangular tubular tailpipe cover 40c is provided around the second tailpipe 36 (see FIG. 1). The tailpipe cover 40c is expanded so that a rear portion thereof is substantially fan-shaped in a top view. The tailpipe cover 40c is provided with an outer exhaust port 40j at a rear end thereof. The outer exhaust port 40j has a substantially trapezoidal shape elongated in the vehicle width direction (see FIG. 2). A vehicle width direction center L2 of the outer exhaust port 40j is located outside a vehicle width direction center L1 of an exhaust port 39a of the first tailpipe 34 (see FIG. 3). Further, a vehicle width direction center of the second tailpipe 36 and the vehicle width direction center L2 of the outer exhaust port 40j are substantially the same.

The substantially annular decorative portion 40b is formed at an opening peripheral edge of the outer exhaust port 40j (see FIG. 2). As shown in FIG. 3, the inner end L3 of the rear edge 40a of the annular decorative portion 40b extends to a position in which a portion of the rear edge 40a overlaps the inclined bracket member 37 in the vehicle width direction.

Two mounting arms 46, 48 are provided on an upper surface 40d of the tailpipe cover 40c, and are attached to attached portions (not shown) on a vehicle body side. Thus, the exhaust finisher 40 is suspended from a panel member (not shown) provided on a lower surface side of the hybrid vehicle 10 with the upper surface 40d in proximity to the panel member. Thus, the exhaust finisher 40 is supported by the panel member provided on the lower surface side of the hybrid vehicle 10 via the mounting arms 46, 48. Therefore, the exhaust finisher 40 is prevented from being displaced in a vehicle up-down direction. When the exhaust finisher 40 is suspended, a front end 36a of the second tailpipe 36 is disposed to be inserted into and covered by the tailpipe cover 40c.

In this embodiment, the two mounting arms 46, 48 provided at front and rear sides allow positions of the attached portions (not shown) on the vehicle body side to be spaced apart from each other in the vehicle width direction. Therefore, when the exhaust finisher 40 is moved by the load input from a rear of the vehicle, displacement in a rotational direction within a horizontal plane is prevented.

The exhaust finisher bracket member 42 is fixed to and supported by the right side surface 40f of the exhaust finisher 40. Therefore, in consideration of a movement amount of the exhaust finisher 40 when it rotates, the exhaust finisher bracket member 42 can be disposed to face the inclined bracket member 37 when they are brought into contact with each other.

Figure 5:
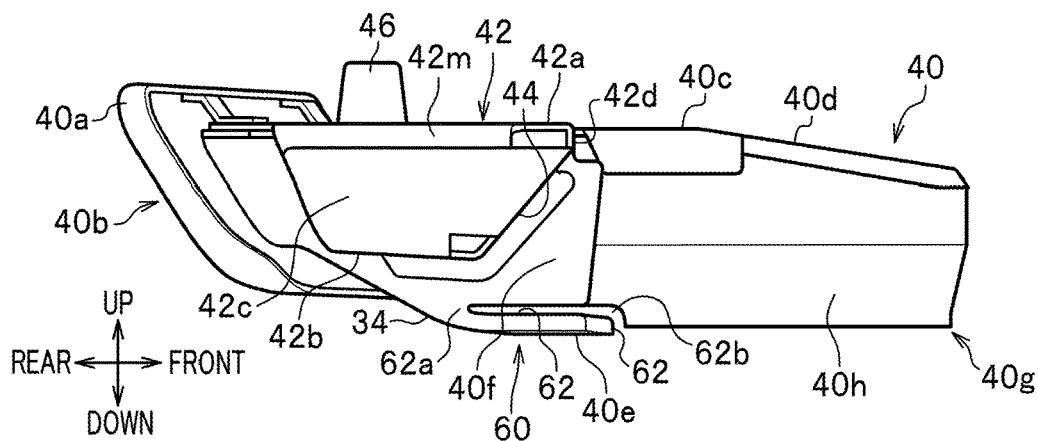
FIG. 5 is a side view of the exhaust device according to the embodiment of the present invention, illustrating the exhaust finisher and the exhaust finisher bracket member viewed from an arrow V direction of FIG. 4.

FIG. 5 is a side view showing the exhaust finisher 40 and the exhaust finisher bracket member 42 viewed from an arrow V direction of FIG. 4. The exhaust finisher 40 has an escape portion 60 which allows the second tailpipe 36 inserted therein to escape in the vehicle downward direction when the exhaust finisher 40 is displaced forward of the vehicle.

In the exhaust finisher 40 of this embodiment, a cut-out portion 40g is formed on the right side surface 40f and a lower surface 40e on the first tailpipe 34 side of the tailpipe cover 40c. The front end 36a of the second tailpipe 36 is removably inserted into the tailpipe cover 40c. A base end 36b of the second tailpipe 36 is partially exposed from the tailpipe cover 40c (see FIG. 1).

The escape portion 60 of this embodiment is configured to include slits 62, 62 constituting a fragile portion. The lower surface 40e located between the slits 62, 62 is deformed by contact with the second tailpipe 36. That is, the slits 62, 62 are respectively formed in the vehicle front-rear direction of left and right side surfaces 40h, 40f of the tailpipe cover 40c along the lower surface 40e. In each of the slits 62, 62, each of front ends 62b, 62b located opposite to base ends 62a, 62a in the vehicle front-rear direction is an open end. Thus, the lower surface 40e can be deformed in the vehicle downward direction along a folding line connecting a pair of left and right base ends 62a, 62a in the vehicle width direction.

Figure 6:
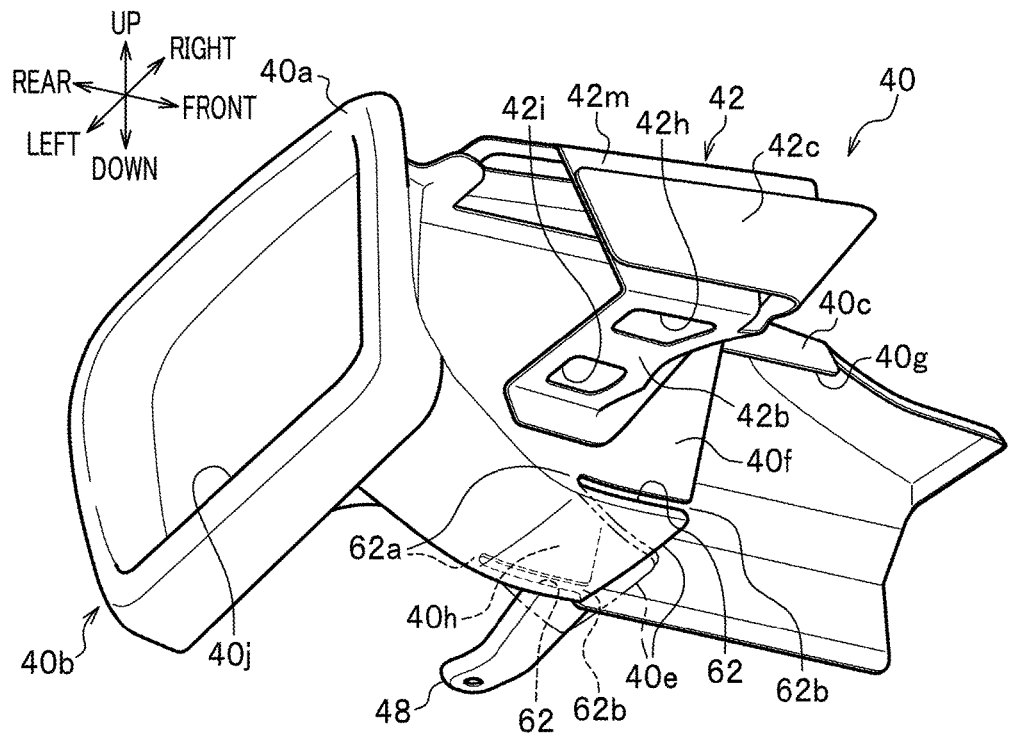
FIG. 6 is a perspective view of the exhaust device according to the embodiment of the present invention, illustrating the exhaust finisher and the exhaust finisher bracket member in the main portion viewed from a lower rear side of the vehicle.

FIG. 6 is a perspective view showing the exhaust finisher 40 and the exhaust finisher bracket member 42 in the main portion viewed from a lower rear side of the vehicle. In the exhaust finisher 40 of this embodiment, when the second tailpipe 36 (see FIG. 1) inserted into the tailpipe cover 40c is displaced downwardly of the vehicle, it contacts an inner surface of the lower surface 40e. Thus, the lower surface 40e is easily bent and deformed downward along the folding line connecting the base ends 62a, 62a of the slits 62, 62 in the vehicle width direction (see two-dot chain lines in FIG. 6). As a result, the second tailpipe 36 can be allowed to escape by protruding downward of the vehicle from inside the tailpipe cover 40c.

FIG. 7 is a side view illustrating a positional relationship between the inclined bracket member 37 and the exhaust finisher bracket member 42. The sliding contact surface 37b and the pressing portion 44 of this embodiment have inclined surfaces which have the same angle α and are inclined rearward and downward of the vehicle. There is the predetermined distance d in the vehicle front-rear direction between the sliding contact surface 37b and the pressing portion 44 of this embodiment. The distance d is set to be constant at each position in the vehicle up-down direction, and thus the sliding contact surface 37b and the pressing portion 44 are parallel and opposed to each other.

Figure 8:
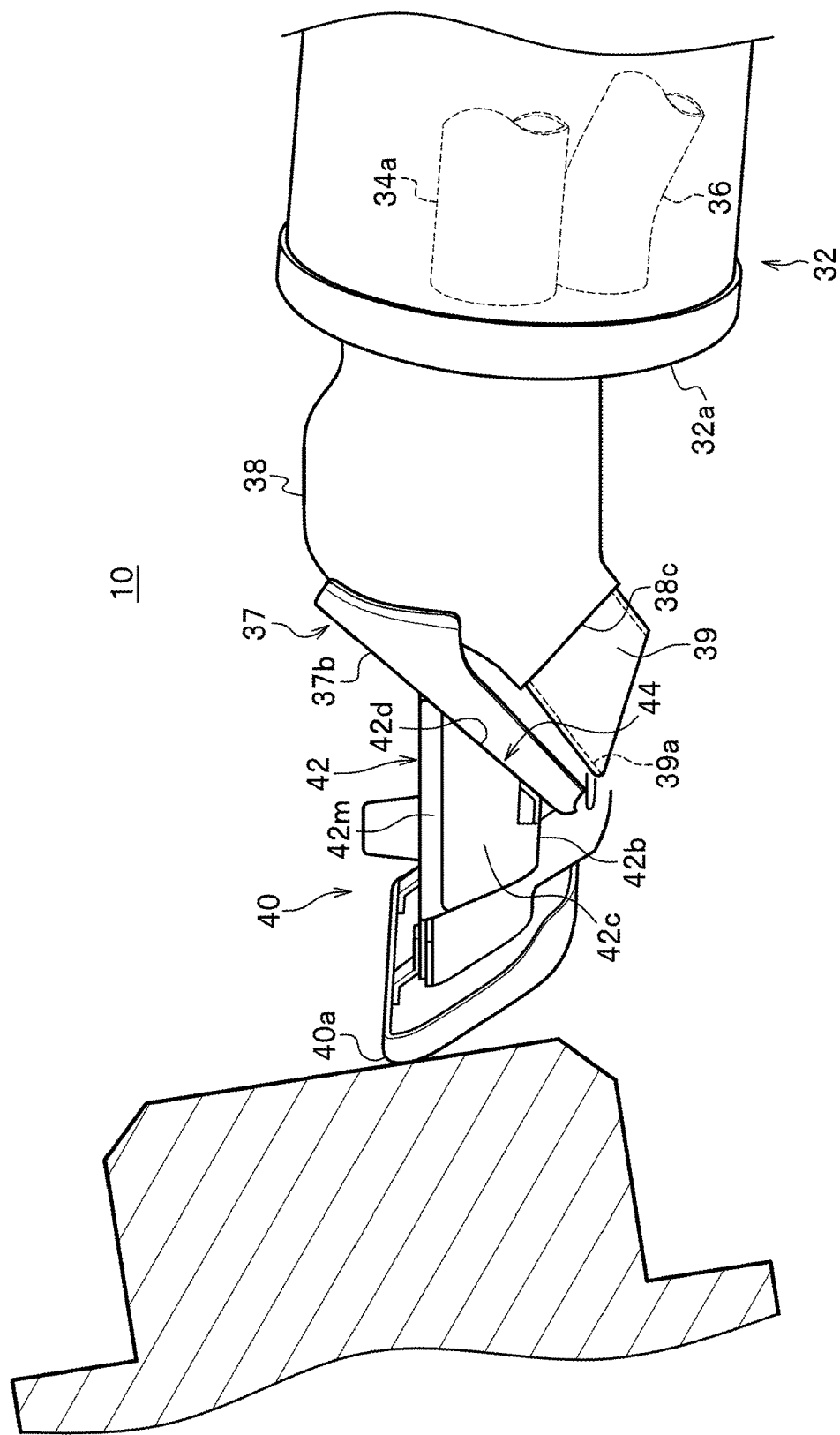
FIG. 8 is a side view of the exhaust device according to the embodiment of the present invention, illustrating the main portion viewed from a right side of the vehicle immediately after start of load input to the exhaust device.

Next, an operation of the exhaust device of this embodiment will be described with reference to FIGS. 8 to 11. FIG. 8 is a side view of the main portion viewed from a right side of the vehicle, illustrating a state immediately after start of the load input to the exhaust device. First, the load is input to the rear portion of the hybrid vehicle 10, and the exhaust finisher 40 moves forward with rotation in an upward and forward direction. At this time, the exhaust finisher 40 is supported by the mounting arms 46, 48. Therefore, rotation in the upward and forward direction of the pressing portion 44 due to forward movement of the exhaust finisher 40 is prevented. By a displacement in the vehicle forward direction of the exhaust finisher 40, the pressing portion 44 is brought into face-to-face contact with the sliding contact surface 37b of the inclined bracket member 37 provided in the first tailpipe 34.

Then, when the pressing portion 44 further moves forward of the vehicle while being sliding contact with the inclined sliding contact surface 37b, it pushes down the first tailpipe 34 in the vehicle downward direction together with the inclined bracket member 37 and the valve cover member 38. Thus, the silencer 32 slides down in the vehicle downward direction. In this embodiment, the front surface 42d is formed larger in the vehicle width direction than the sliding contact surface 37b of the inclined bracket member 37, and is formed in a concave curved shape. Therefore, when the front surface 42d is brought into contact with or is in sliding contact with the sliding contact surface 37b, the inclined bracket member 37 is unlikely to get out of the pressing portion 44 in the vehicle width direction.

The pressing portion 44 formed in the exhaust finisher bracket member 42 having a relatively high rigidity can efficiently transmit a downward load to the inclined bracket member 37 by sliding contact. Therefore, the pressing portion 44 reliably pushes down the first tailpipe 34 by sliding contact with the sliding contact surface 37b of the inclined bracket member 37.

Figure 9:
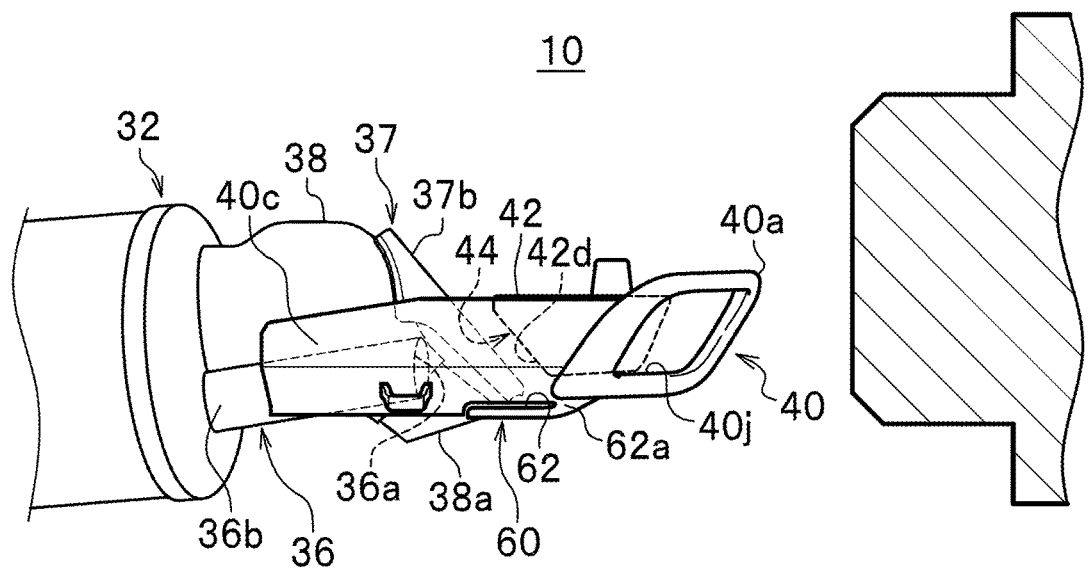
FIG. 9 is a side view of the exhaust device according to the embodiment of the present invention, illustrating the main portion viewed from a left side of the vehicle before the load is input to the exhaust device.
Figure 10:
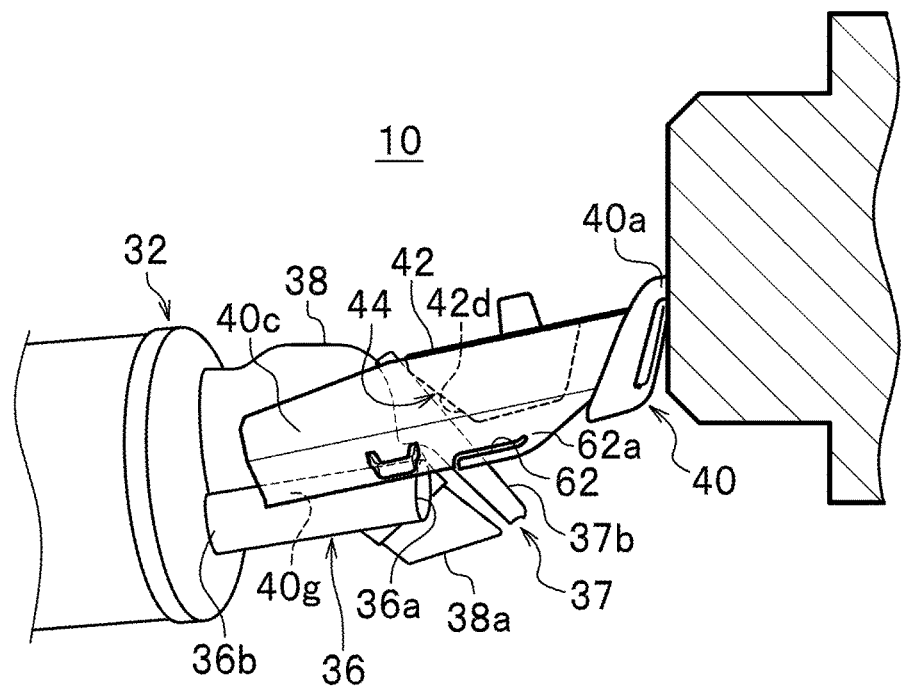
FIG. 10 is a side view of the exhaust device according to the embodiment of the present invention, illustrating the main portion viewed from the left side of the vehicle in a state in which the load is input to the exhaust device.

FIG. 9 is a side view of the exhaust device according to the embodiment of the present invention, illustrating a state before the load is input to the exhaust device. FIG. 10 is a side view of the main portion, illustrating a state in which the exhaust device is deformed by the load. FIGS. 9, 10 illustrate a case in which the front end 36a of the second tailpipe 36 does not reach the lower surface 40e formed with the slits 62 in the tailpipe cover 40c when the load is input to the exhaust device.

Before the load is input as shown in FIG. 9, the pressing portion 44 does not contact the sliding contact surface 37b. In this state, the front end 36a of the second tailpipe 36 is slidably inserted into the tailpipe cover 40c. Therefore, the exhaust finisher 40 is allowed to be displaced in the vehicle front-rear direction.

At this point, the pressing portion 44 faces the sliding contact surface 37b of the inclined bracket member 37 with the predetermined distance d therebetween in the vehicle front-rear direction. Therefore, even when the load is input to an extent that a bumper is bent and is restorable like a light collision, the pressing portion 44 does not reach the sliding contact surface 37b. As a result, in such a case, the silencer 32 is not pushed down so as to continue good running.

As shown in FIG. 10, when the load is input from the rear of the vehicle in the vehicle forward direction, the exhaust finisher bracket member 42 moves forward of the vehicle together with the exhaust finisher 40. In the exhaust device of this embodiment, the upper side of the rear edge 40a of the exhaust finisher 40 first receives the input load. Therefore, the exhaust finisher 40 is displaced in the vehicle forward direction with a rotation upward of the vehicle.

When the silencer 32 is pushed downwardly of the vehicle by contact with the pressing portion 44, the front end 36a of the second tailpipe 36 does not reach a portion formed with the slits 62. Therefore, the front end 36a protrudes downward of the tailpipe cover 40c from the cut-out portion 40g. As a result, the second tailpipe 36 does not interfere with the exhaust finisher 40, and the silencer 32 is applied with the downward load from the inclined bracket member 37 so as to be pushed downwardly of the vehicle together with the valve cover member 38. The silencer 32 is displaced downwardly of the hybrid vehicle 10 as described above, and thus it is possible to prevent the silencer from interfering with the battery 22 even when the electrical component such as the battery 22 is disposed in front of the silencer 32 (see FIG. 1).

Figure 11:
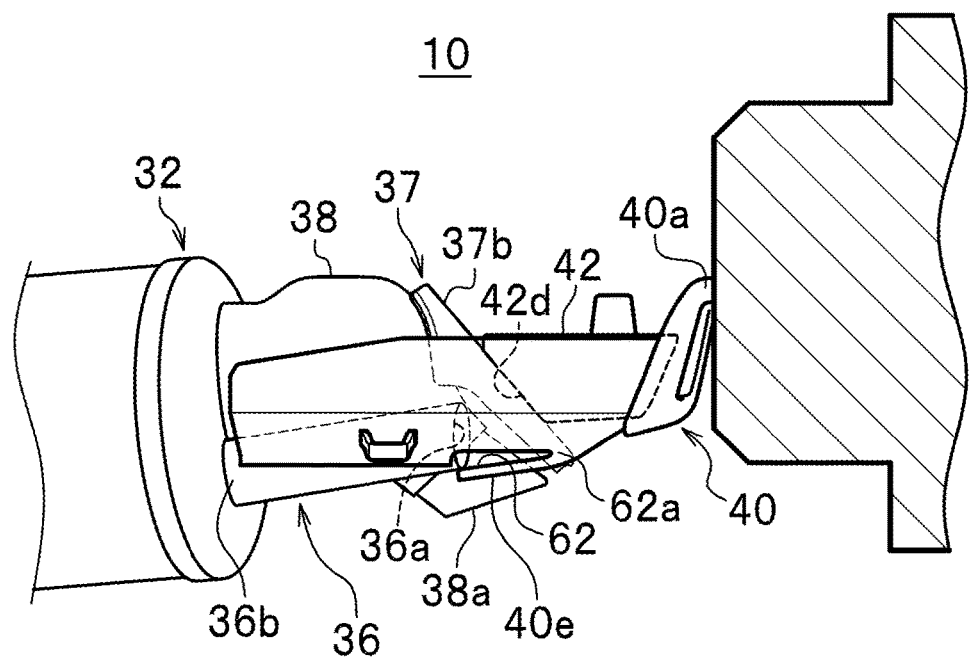
FIG. 11 is a side view of the exhaust device according to the embodiment of the present invention, illustrating the main portion viewed from the left side of the vehicle in a state in which the load is input to the exhaust device and a fragile portion is deformed.

FIG. 11 is a side view of the exhaust device according to the embodiment of the present invention, illustrating the main portion viewed from the left side of the vehicle in a state in which the fragile portion formed behind the escape portion 60 is deformed. In FIG. 11, the front end 36a of the second tailpipe 36 is removably inserted into the exhaust finisher 40.

The lower surface 40e of the exhaust finisher 40 is formed with the fragile portion capable of being easily bent on a side of the base ends 62a by a pair of left and right slits 62 formed in the tailpipe cover 40c. FIG. 11 shows a state in which the front end 36a of the second tailpipe 36 reaches the portion formed with the slits 62 in the exhaust finisher 40. That is, the silencer 32 slides down by the displacement in the vehicle forward direction of the exhaust finisher 40. As the silencer 32 slides down, the front end 36a of the second tailpipe 36 is intended to be displaced downwardly from the cut-out portion.

At this time, the front end 36a moves in the vehicle forward direction to a position inserted into the exhaust finisher 40. Therefore, the second tailpipe 36 presses the inner surface of the lower surface 40e by the front end 36a thereof. The lower surface 40e is pushed downward and is easily bent and deformed along the folding line connecting the base ends 62a, 62a having lower rigidity than other portions due to formation of the slits 62, 62 (see FIG. 6). In this manner, in the exhaust device of this embodiment, the fragile portion is formed in the lower surface 40e of the tailpipe cover 40c by forming the slits 62, 62. Therefore, the lower surface 40e can be easily bent and deformed downward from the base ends 62a by contact with the second tailpipe 36 (see FIG. 6). As a result, the front end 36a of the second tailpipe 36 inserted into the tailpipe cover 40c in the vehicle rearward direction can escape in the vehicle downward direction.

In the exhaust device of this embodiment, the inclined surface of the sliding contact surface 37b and the inclined surface of the front surface 42d of the pressing portion 44 are provided facing each other in parallel at the same angle α inclined rearward and downward of the vehicle. Thus, when the pressing portion 44 contacts the sliding contact surface 37b, they contact each other with their surfaces over a large area, so that probability of load concentration can be low. Therefore, when the pressing portion 44 is in sliding contact with the sliding contact surface 37b to push down the silencer 32, resistance is equalized. As a result, the inclined bracket member 37 and the valve cover member 38 can smoothly slide downwardly of the vehicle.

As described above, in the exhaust device of the hybrid vehicle 10 of this embodiment, when the exhaust finisher 40 is displaced forward of the vehicle, it contacts the first tailpipe 34 to push down the first tailpipe 34 in the vehicle downward direction. Thus, the silencer 32 slides downwardly of the vehicle.

As the exhaust finisher 40 is displaced forward of the vehicle, the exhaust finisher bracket member 42 moves the pressing portion 44 in a direction to be in contact with the first tailpipe 34. Therefore, the load applied from the rear of the vehicle reliably becomes a force to push down and slide down the silencer 32 via the pressing portion 44 of the exhaust finisher bracket member 42.

The pressing portion 44 of the exhaust finisher bracket member 42 or the sliding contact surface 37b of the first tailpipe 34 has an inclined surface inclined rearwardly and downwardly. When the exhaust finisher 40 is displaced forward of the vehicle due to the load input from the rear of the vehicle, the pressing portion 44 is brought into contact with the sliding contact surface 37b provided in the inclined bracket member 37. Then, the pressing portion 44 pushes down the valve cover member 38 in the vehicle downward direction via the inclined bracket member 37 while being in sliding contact with the sliding contact surface 37b. Therefore, the downward load is reliably transmitted to the silencer 32 so that the silencer 32 can slide down.

Further, by the inclined surface inclined rearwardly and downwardly of the sliding contact surface 37b of the first tailpipe 34, the first tailpipe 34 is pushed down in the vehicle downward direction when the load from the rear of the vehicle is applied to the inclined surface.

When the exhaust finisher 40 is displaced forward of the vehicle, the second tailpipe 36 inserted into the exhaust finisher 40 can escape in the vehicle downward direction by the escape portion 60.

Further, when the exhaust finisher 40 is displaced forward of the vehicle, the second tailpipe 36 can escape in the vehicle downward direction while the fragile portion is deformed by contact with the second tailpipe 36.

The present invention is not limited to the embodiments described above, but may be variously modified. The embodiments described above are shown as examples in order to better understand the present invention, and are not necessarily limited to the embodiments including all the components described above. A part of components of an embodiment may be replaced with components of another embodiment, and components of an embodiment may be added to components of another embodiment. Further, a part of components of an embodiment may be deleted, added to or replaced with components of another embodiment. For example, possible modifications to the embodiments are as follows.

In a vehicle rear structure of this embodiment, the inclined bracket member 37 is provided on the rear side surface 38b of the valve cover member 38, it is not limited thereto. For example, a sliding contact surface portion having an inclined surface inclined rearwardly and downwardly may be directly formed on the rear side surface 38b of the valve cover member 38 without using the inclined bracket member 37. That is, the sliding contact surface portion only has to push down the first tailpipe 34 by changing the load input from the exhaust finisher bracket member 42 being displaced forward of the vehicle to a downward load. Therefore, the number, shape and material of parts and members constituting the sliding contact surface portion are not particularly limited. Further, a shape of the exhaust finisher bracket member 42 is also not limited to a trapezoidal shape in a side view, but the exhaust finisher bracket member 42 may have another shape such as an inverted triangle, a circle or a semicircle. Therefore, the number, shape and material of members constituting the exhaust finisher bracket member 42 are not particularly limited as long as the exhaust finisher bracket member 42 can push down the first tailpipe 34.

In this embodiment, as shown in FIG. 7, the sliding contact surface 37b formed with the inclined surface inclined rearwardly and downwardly at the predetermined angle α is provided in the inclined bracket member 37. Further, the pressing portion 44 facing the sliding contact surface 37b is provided with the front surface 42d inclined at the same angle with the predetermined angle α (see FIG. 7) of the sliding contact surface 37b. However, it is not limited thereto, but at least one of the sliding contact surface 37b and the pressing portion 44 only has to be inclined. That is, shapes of both in sliding contact with each other only have to be defined so that the first tailpipe 34 is pushed down when the exhaust finisher 40 is displaced forward of the vehicle. Thus, the number, shape, material and combination of the exhaust finisher bracket member 42 and the inclined bracket member 37 or the valve cover member 38 are not particularly limited.

Further, in this embodiment, the hybrid vehicle 10 having the battery 22 as the electrical component has been described by way of example, it is not limited thereto. The electrical component is not limited to a secondary storage battery as long as it is a component disposed in front of the silencer 32, but may be an electrical component of any configuration, for example, an electrical circuit such as an inverter or a converter, an electrical component such as a capacitor, or an electronic circuit. The vehicle is not necessarily the hybrid vehicle 10, but may be a vehicle having a silencer system, such as a vehicle having only an engine as a drive source.

REFERENCE SIGNS LIST

10: hybrid vehicle (vehicle)
20: hybrid system
22: battery (electrical component)
30: silencer system
32: silencer
34: first tailpipe
36: second tailpipe
37b: sliding contact surface (inclined surface)
38c, 39a: exhaust port
40: exhaust finisher
42: exhaust finisher bracket member
42d: front surface (inclined surface)
44: pressing portion
60: escape portion
62: slit (fragile portion)

The invention claimed is:

1. An exhaust device for a vehicle equipped with a silencer system for silencing an exhaust sound of an internal combustion engine, wherein the silencer system comprises:
   a silencer located at a rear portion of the vehicle;
   a first tailpipe connected to the silencer;
   a second tailpipe disposed adjacent to the first tailpipe; and
   an exhaust finisher provided on the second tailpipe, and wherein
   the exhaust finisher has an exhaust finisher bracket member for pushing down the first tailpipe when the exhaust finisher is displaced forward of the vehicle.

2. The exhaust device for the vehicle according to claim 1 wherein the exhaust finisher bracket member is provided on a side surface of the exhaust finisher, and is provided with a pressing portion at a position facing the first tailpipe in a vehicle front-rear direction.

3. The exhaust device for the vehicle according to claim 1, wherein at least one of the exhaust finisher bracket member and the first tailpipe has an inclined surface inclined rearwardly and downwardly.

4. The exhaust device for the vehicle according to claim 1, wherein an inclined bracket member having an inclined surface inclined rearwardly and downwardly is provided on a rear surface side of the first tailpipe.

5. The exhaust device for the vehicle according to claim 3, wherein the exhaust finisher is inserted with the second tailpipe, and has an escape portion which allows the second tailpipe to escape in a vehicle downward direction when the exhaust finisher is displaced forward of the vehicle.

6. The exhaust device for the vehicle according to claim 4, wherein the exhaust finisher is inserted with the second tailpipe, and has an escape portion which allows the second tailpipe to escape in a vehicle downward direction when the exhaust finisher is displaced forward of the vehicle.

7. The exhaust device for the vehicle according to claim 5, wherein the escape portion comprises a fragile portion to be deformed by contact with the second tailpipe.

8. The exhaust device for the vehicle according to claim 6, wherein the escape portion comprises a fragile portion to be deformed by contact with the second tailpipe.

\* \* \* \* \*